Dec. 22, 1942.  G. HANSEN  2,305,776
OPTICAL SYSTEM FOR SPECTRAL APPARATUS WITH FIXED DEVIATION
Filed Nov. 4, 1940
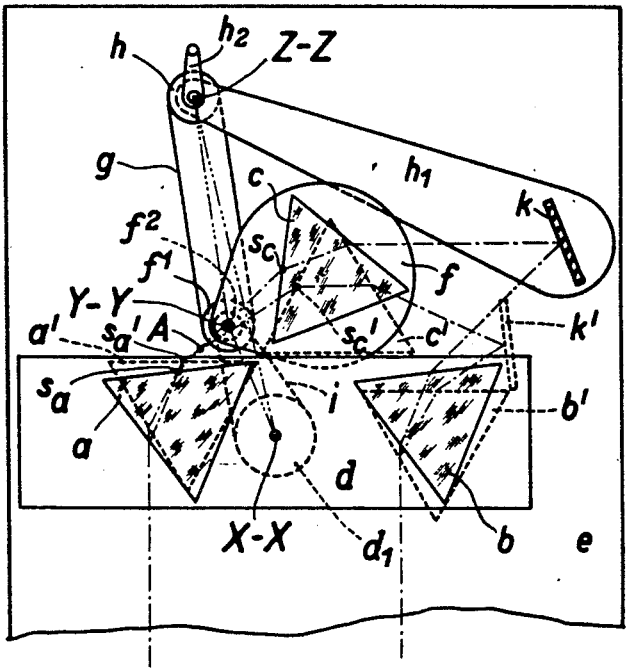
Inventor:
Gerard Hansen.

Patented Dec. 22, 1942

2,305,776

UNITED STATES PATENT OFFICE 2,305,776

OPTICAL SYSTEM FOR SPECTRAL APPARATUS WITH FIXED DEVIATION

Gerhard Hansen, Jena, Germany; vested in the Alien Property Custodian

Application November 4, 1940, Serial No. 364,170
In Germany December 11, 1939

3 Claims. (Cl. 88—14)

The invention relates to an optical system for spectral apparatus with fixed deviation, said system containing a mirror and a number of prisms of equal refracting angles and equal refractive indices, the effective surfaces of said members being perpendicular to one and the same plane and, for the purpose of giving them rotations in the same sense and parallel to said plane, said members being so coupled to one another that the deviation of the axial ray is always a minimum.

A known optical system of this kind contains three glass prisms of equal refractive power two of which have equal refracting angles while the third has an interior reflecting surface. This known set of prisms, whose emerging and entering axial rays subtend an angle of 90°, is not suitable for using prisms of double refracting material since a prism with an inner reflecting surface cannot be made free from double refraction.

Another known optical system of this type contains seven prisms and a mirror which forms the rearmost member of the system and from which the axial ray emerges perpendicular to the direction which it had when entering the system. In this known system the prisms and the mirror are coupled to perform comparatively complicated movements so that it is very difficult to achieve the degree of accuracy required for the path of the rays.

According to the invention these drawbacks can be avoided if the optical system in question is so designed that it contains four members which are rotatable about rotation-axes of invariable relative position, viz., a mirror forming one of the two medial members and three prisms representing the foremost, the rearmost and the other medial member and furthermore, if the means coupling the said four members is such that the foremost and the rearmost members on one hand and the two medial members on the other rotate by like amounts in such a manner that three times the rotation-angle of the two medial members corresponds to the rotation-angle of the foremost and the rearmost members and, if the foremost and the rearmost members have a common axis of rotation so that said two members may be disposed on one common support.

An optical system of this kind where either the second or the third member may be designed as a mirror can be used for quartz prisms as well as for glass prisms. Such an optical system allows to conduct the light rays in such a manner that the emerging and the entering axial ray are parallel to one another. By thus conducting the rays in the case of long-focus spectroscope lenses, the advantage is obtained that the lateral dimensions of the apparatus can be kept very small.

A suitable construction is obtained if the rotation axis of the medial prism lies between that prism and the adjoining prism in front or in the rear thereof, in such a manner that it intersects the bisectrix of the angle whose two sides are formed by the axial ray in the two limit-positions of the medial prism and that the distance of the rotation axis from the vertex of said angle amounts to half the distance of said axis from a plane, perpendicular to the supporting surfaces of the prisms and passing through the two points at which the sides of said angle meet in the one and the other limit position, respectively, of this medial prism, that surface of it which faces the prism lying before or behind it. In this case particularly advantageous conditions are attained for the cross-section of the pencil of light rays passing through the optical system if the distance apart of the common rotation axis of the foremost and the rearmost prism and the rotation axis of the medial prism is about half the distance apart of the latter rotation axis and the rotation axis of the mirror, while the first said distance amounts to about a third of the distance apart of the first mentioned rotation axis and the last mentioned rotation axis.

The drawing shows a plan-view of an example of an optical system constructed according to the invention.

The optical system contains three quartz prisms $a$, $b$, and $c$, the principal sections of which are equilateral triangles of the same size, lying parallel to the drawing plane. The two prisms $a$ and $b$ are fixed on a support $d$ in such a manner that corresponding surfaces are reciprocally parallel. The support $d$ is rotatably mounted on a base plate $e$ around an axis X—X, which latter is perpendicular to the principal sections of the prisms. The prism $c$ is fixed to a supporting body $f$, which is rotatably mounted on the base plate $e$ around an axis Y—Y, which is parallel to the axis X—X. To the supporting body $f$ are fixed two discs $f_1$ and $f_2$, of which $f_1$ is coupled by means of a steel belt $g$ to a disc $h$ of equal diameter, said disc $h$ being rotatably mounted on the base plate on an axis Z—Z parallel to the axes X—X and Y—Y; while the other disc $f_2$ is coupled by means of a steel belt $i$ to a disc $d_1$ attached to the support $d$, this disc $d_1$ having treble the diameter of the disc $f_2$. The disc $h$ is firmly fixed to a plate $h_1$ which bears a mirror $k$ whose reflecting surface is parallel to the axis Z—Z. The disc $h$ can be rotated by means of a crank $h_2$. Owing to this arrangement each turn of the disc $h$ produces an equally large rotation of the supporting body $f$ with the prism $c$ around the axis Y—Y and one-third of a rotation of the support $d$ with the prisms $a$ and $b$ around the axis X—X.

The prisms $a$, $b$, and $c$ and the mirror $k$ are shown in the drawing in their limit-position corresponding to a certain wave-length. In said limit-position the axial ray follows such a path in the optical system that the direction of the axial ray before entering the prism $a$ is parallel to its direction after emerging from prism $b$. In the second limit-position the prisms and the mirror are shown in dotted lines $a'$, $b'$, $c'$ and $k'$. In both limit-positions of the prisms the axial ray between the prisms $a$ and $c$ has two different positions $s_a$, $s_c$, and $s_a'$, $s_c'$ which are inclined towards each other and intersect at A. The spacing of the rotation axis Y—Y from A is half that of its spacing from $s_c$, $s_c'$. The relative positions of the axes X—X, Y—Y, and Z—Z are such that the spacing of the axis X—X from axis Y—Y is about half the spacing of axis Y—Y from axis Z—Z and about a third of the spacing of axis X—X from axis Z—Z.

I claim:

1. Optical system for spectroscopes with fixed deviation, said system comprising four members, viz. one mirror and three prisms of equal refractive angles and of equal refractive indices, the effective surfaces of said four members being perpendicular to one and the same plane, with reference to the light path said mirror being one of the two medial of said four members, and said three prisms being the foremost, the rearmost and the other medial member, a carrier, each of said four members for the purpose of adjustment between two boundary positions being rotatably mounted on said carrier about an axis perpendicular to said plane, the axes of rotation of said foremost and of said rearmost member coinciding with each other, and means for coupling said four members to each other, said coupling means causing equal rotations of said foremost and said rearmost member through an angle $\phi$ to correspond to equal rotations of said two medial members through an angle $3\phi$.

2. Optical system for spectroscopes with fixed deviation, said system comprising four members, viz., one mirror and three prisms of equal refractive angles and of equal refractive indices, the effective surfaces of said four members being perpendicular to one and the same plane, with reference to the light path said mirror being one of the two medial of said four members, and said three prisms being the foremost, the rearmost and the other medial member, a carrier, each of said four members for the purpose of adjustment between two boundary positions being rotatably mounted on said carrier about an axis perpendicular to said plane, the axes of rotation of said foremost and of said rearmost member coinciding with each other, the axis of rotation of said medial prism cutting the line bisecting the angle formed by the intersection of those parts of two axial rays appertaining to the two limit-positions of said four members, which extend between the two surfaces, turned to each other, of said medial prism and the prism adjacent said medial prism, the distance of said axis of rotation from the apex of said angle being half the distance of said axis from a plane perpendicular to the first said plane and containing to points each of which is determined by the intersection of one of said two ray parts with that surface of said medial prism in its appertaining limit-position, which faces said adjacent prism, and means for coupling said four members to each other and causing equal rotations of said foremost and said rearmost member through an angle $\phi$ to correspond to equal rotations of said two medial members through an angle $3\phi$.

3. Optical system according to claim 2, the distance apart of the common axis of rotation (X—X) of said foremost and said rearmost prism and the axis of rotation (Y—Y) of said medial prism being about half the distance apart of the axis of rotation (Y—Y) of said medial prism and the axis of rotation (Z—Z) of said mirror, and the first said distance being about a third of the distance apart of the first said axis of rotation (X—X) and the last said axis of rotation (Z—Z).

GERHARD HANSEN.